(12) United States Patent
Jehl et al.

(10) Patent No.: US 8,999,439 B2
(45) Date of Patent: Apr. 7, 2015

(54) PROCESS FOR MANUFACTURING A THERMOSTRUCTURAL COMPOSITE PART

(75) Inventors: Dominique Jehl, Habsheim (FR); Eric Philippe, Merignac (FR); Michel Laxague, Bordeaux Cauderan (FR); Marie-Anne Dourges, Talence (FR)

(73) Assignee: Herakles, Le Haillan (FR)

( * ) Notice: Subject to any disclaimer, the term of this patent is extended or adjusted under 35 U.S.C. 154(b) by 1289 days.

(21) Appl. No.: 12/446,654

(22) PCT Filed: Oct. 25, 2007

(86) PCT No.: PCT/FR2007/052240
§ 371 (c)(1),
(2), (4) Date: Apr. 22, 2009

(87) PCT Pub. No.: WO2008/050068
PCT Pub. Date: May 2, 2008

(65) Prior Publication Data
US 2010/0086679 A1    Apr. 8, 2010

(30) Foreign Application Priority Data
Oct. 26, 2006 (FR) ...................................... 06 54542

(51) Int. Cl.
| B05D 7/00 | (2006.01) |
| C04B 35/83 | (2006.01) |
| C04B 35/589 | (2006.01) |
| C04B 35/626 | (2006.01) |

(Continued)

(52) U.S. Cl.
CPC .............. *C04B 35/83* (2013.01); *C04B 35/589* (2013.01); *C04B 35/6269* (2013.01); *C04B 35/806* (2013.01); *C04B 38/0645* (2013.01); *C04B 2235/5244* (2013.01); *C04B 2235/5248* (2013.01); *C04B 2235/614* (2013.01); *C04B 2235/616* (2013.01)

(58) Field of Classification Search
USPC .......................................................... 427/228
See application file for complete search history.

(56) References Cited

U.S. PATENT DOCUMENTS

| 3,829,327 A | 8/1974 | Omori et al. |
| 4,919,978 A * | 4/1990 | Winkler et al. ............... 427/381 |

(Continued)

FOREIGN PATENT DOCUMENTS

| EP | 1120484 | 8/2001 |
| EP | 1120484 A1 | 8/2001 |

(Continued)

*Primary Examiner* — Robert Vetere
(74) *Attorney, Agent, or Firm* — Preti Flaherty Beliveau & Pachios LLP

(57) ABSTRACT

The invention relates to a method of fabricating a composite material part comprising fiber reinforcement densified by a matrix, the method comprising the steps of:
- making a fiber preform consolidated by impregnating (S4) a fiber texture made up of yarns with a liquid consolidation composition containing a precursor for a consolidating material, and by transforming (S7) the precursor into consolidating material by pyrolysis so as to obtain a consolidated preform that is held in shape; and
- densifying (S8) the consolidated fiber preform by chemical vapor infiltration;
- the method being characterized in that it includes, prior to impregnation (S4) of the fiber texture with the consolidation liquid composition, a step of filling (S2) the pores of the yarns of said fiber texture by means of a filler composition.

20 Claims, 7 Drawing Sheets

(51) Int. Cl.
  *C04B 35/80* (2006.01)
  *C04B 38/06* (2006.01)

(56) References Cited

U.S. PATENT DOCUMENTS 5,024,978 A * 6/1991 Allaire et al. ................ 501/95.2
5,350,545 A    9/1994 Streckert et al.
5,486,379 A * 1/1996 Bouillon et al. ............... 427/212
6,309,703 B1 * 10/2001 Wapner et al. ................ 427/288

FOREIGN PATENT DOCUMENTS

| EP | 1277716 | 1/2003 |
| EP | 1277716 A1 * | 1/2003 |
| GB | 2151221 | 7/1985 |
| WO | WO 01/38625 | 5/2001 |

\* cited by examiner

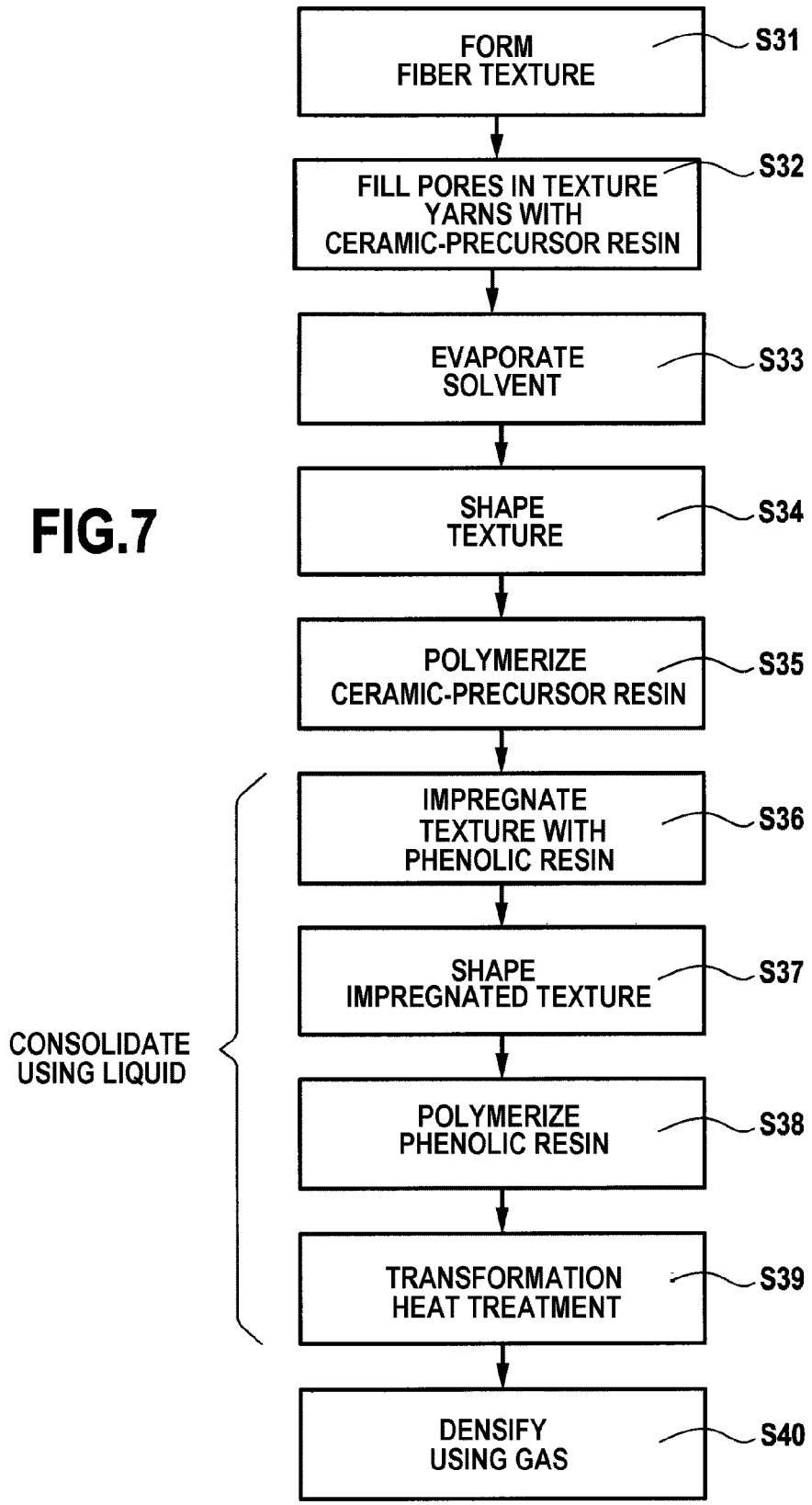

PROCESS FOR MANUFACTURING A THERMOSTRUCTURAL COMPOSITE PART

BACKGROUND OF THE INVENTION

The present invention relates to a method of fabricating a composite material part that comprises fiber reinforcement densified by a matrix.

The field of application of the invention relates more particularly to thermostructural composite materials, i.e. composite materials having good mechanical properties and the ability to conserve these properties at high temperature. Typical thermostructural composite materials are carbon/carbon (C/C) composite materials made up of carbon fiber reinforcement densified by a carbon matrix, and ceramic matrix composite (CMC) materials made up of refractory fiber reinforcement (carbon fibers or ceramic fibers) densified by a matrix that is made of ceramic, at least in part. Examples of CMCs are C/SiC composites (carbon fiber reinforcement and silicon carbide matrix), C/C—SiC composites (carbon fiber reinforcement and a matrix comprising both a carbon phase, generally close to the fibers, and a silicon carbide phase), and SiC/SiC composites (reinforcing fibers and matrix made of silicon carbide). An interphase layer may be interposed between reinforcing fibers and the matrix in order to improve the mechanical behavior of the material.

Fabricating a thermostructural composite material part generally comprises making a fiber preform of a shape that is close to the shape of the part that is to be fabricated, and then densifying the preform with the matrix.

The fiber preform constitutes the reinforcement of the part and its function is essential for obtaining good mechanical properties. The preform is obtained from fiber textures: yarns, tows, braids, woven fabrics, felts, . . . . Shaping is generally performed by winding, weaving, stacking, and possibly needling together two-dimensional plies of woven fabric or sheets of tows, . . . .

Densifying the fiber preform consists in filling the pores in the preform with the material constituting the matrix, which material occupies all or a fraction of the volume of the preform.

The matrix of a thermostructural composite material may be obtained using various known techniques, and in particular using a liquid or a gas.

The liquid technique consists in impregnating the preform with a liquid composition containing an organic precursor of the matrix material. The organic precursor is usually in the form of a polymer, such as a resin, and it is optionally diluted in a solvent. The precursor is transformed into a refractory phase by heat treatment, after eliminating the optional solvent and curing the polymer. The heat treatment consists in pyrolyzing the organic precursor in order to transform the organic matrix into a carbon or ceramic matrix depending on the precursor used and on the conditions of pyrolysis. By way of example, liquid precursors for carbon may be resins having a relatively high coke content, such as phenolic resins, whereas liquid precursors for ceramic, in particular for SiC, may be resins of the polycarbosilane (PCS) or of the polytitanocarbosilane (PTCS) or of the polysilazane (PSZ) type. A plurality of consecutive cycles going from impregnation to heat treatment may be performed in order to achieve the desired degree of densification.

The gas technique consists in chemical vapor infiltration. The fiber preform is placed in an oven into which a reaction gas is admitted. The pressure and the temperature that exist within the oven, and the composition of the gas, are all selected in such a manner as to enable the gas to diffuse within the pores of the preform in order to form the matrix therein by depositing a solid material in contact with the fibers, which material results from components of the gas decomposing or from a reaction between a plurality of its components. By way of example, gaseous precursors of carbon may be hydrocarbons that produce carbon by cracking, such as methane, and a gaseous precursor of a ceramic, in particular of SiC, may be methyltricholorosilane (MTS) that gives SiC by decomposition of the MTS (optionally in the presence of hydrogen).

Except when the texture already presents the desired shape and fiber fraction, preparing a thermostructural composite material by densification using a gas technique generally begins with a so-called "consolidation" stage that serves to freeze both the shape of the fiber preform and also the fiber fraction of the material (i.e. the percentage of the total apparent volume of the material that is actually occupied by the fibers).

Using a gas technique for consolidation presents a certain number of drawbacks. In order to keep the preform in the desired shape during chemical vapor infiltration for the consolidation step, it is necessary to hold the preform by using tooling made of graphite. Graphite tooling is complex and expensive to make. In addition, graphite tooling ages quickly since it densifies at the same time as the preforms it is holding in shape. Finally, such tooling occupies a significant fraction of the working volume within the CVI oven and it presents a large amount of thermal inertia.

For these reasons, the fiber preform is preferably consolidated using a liquid technique. The fiber texture constituting the preform is impregnated with an organic precursor for the matrix, and it is then shaped by means of tooling (mold or shaper) made of metal or composite material that is reusable and that presents an implementation cost that is much smaller than the cost of tooling made of graphite. Thereafter, the precursor, possibly after drying and polymerizing, is transformed by heat treatment so that, after pyrolysis, there remains a solid residue that serves to consolidate the preform, thus enabling the preform to be placed on its own (i.e. without being held by tooling) in a CVI oven so as to continue densification using a gas technique.

Nevertheless, the thermomechanical characteristics of thermostructural composite materials that have been consolidated and densified by a gas technique are much better than those of known composite materials that have first been consolidated by a liquid technique and then densified by a gas technique. This difference in performance can be explained in particular by the fact that during consolidation by the liquid technique, the matrix that is obtained by the liquid technique is concentrated within the yarns of the composite, thereby preventing the yarns themselves being densified by the matrix obtained when using the gas technique during the subsequent densification step. In addition, consolidation using a liquid technique always leaves residual pores within the yarns because of the inevitably incomplete nature of the transformation of the liquid precursor, given that the pyrolytic yield of organic precursors is always less than 100%. These pores are generally difficult to access from the surfaces of the yarns and consequently they cannot be filled during the subsequent densification by the gas technique. Unfortunately, in order to obtain good mechanical characteristics, it is important to minimize as much as possible any heterogeneous porosity within the composite material.

Furthermore, since the thermomechanical characteristics of the matrix obtained by the liquid technique are generally less good than those of a matrix deposited by a gas technique, composite materials in which the yarns contain in the great majority only the matrix obtained by the liquid technique present thermomechanical properties that are less good.

When using a carbon-precursor resin (e.g. phenolic resin) for consolidating CMC materials, because the coke obtained after the resin has been pyrolyzed presents very fast reaction kinetics in oxidation, the strength of the material for long duration utilization in an oxidizing atmosphere is degraded whenever the temperature exceeds 400° C.

Several options exist for improving the thermomechanical properties of CMC materials that have been consolidated by a liquid technique using a carbon-precursor resin. A first option consists in reducing the coke content present in the resin. A second option consists in using fillers that enable a glass to be formed that provides protection against oxidation.

Nevertheless, the extent to which the quantity of consolidation resin can be reduced in order to reduce the coke content is limited, since below a certain quantity of coke the consolidating effect is no longer ensured. Furthermore, using healing fillers, i.e. fillers that enable a glass to be formed to provide protection against oxidation, becomes effective only from the temperature at which protective glass is formed by oxidizing the fillers. The fillers generally used are fillers containing boron ($B_4C$, $SiB_6$, $TiB_2$, etc.), since they make it possible to obtain boron oxide ($B_2O_3$), which is a protective glass have a low softening point. Nevertheless, such fillers can produce a protective effect only at temperatures above 500° C.

To summarize, although the liquid technique greatly simplifies consolidating a fiber texture in comparison with the gas technique, it nevertheless prevents the matrix obtained by the gas technique from being deposited all the way to the cores of the yarns during subsequent densification. In addition, when using a carbon-precursor resin, pyrolysis of the resin leaves residual coke within the yarns, thereby reducing the mechanical strength of the material at high temperatures, and degrading its ability to withstand oxidation.

Consequently, there exists a need to obtain composite materials that present improved thermomechanical characteristics, while conserving the advantages of consolidation by a liquid technique.

OBJECT AND SUMMARY OF THE INVENTION

An object of the present invention is to propose a method of fabricating a composite material part that enables the matrix obtained by the liquid technique during consolidation of the preform to be concentrated on the outsides of the yarns, in order to improve the thermomechanical characteristics of composite material parts in which the fiber preform is initially consolidated by a liquid technique.

To this end, the invention provides a method of fabricating a composite material part, said method comprising the steps of: making a fiber preform that is consolidated by impregnating a fiber texture made up of yarns with a liquid consolidation composition containing a precursor for a consolidating material, and by transforming the precursor into consolidating material by pyrolysis so as to obtain a consolidated preform that is held in shape; and densifying the consolidated fiber preform by chemical vapor infiltration;

in which method, prior to impregnation of the fiber texture with the consolidation liquid composition, a step is performed of filling the pores of the yarns of said fiber texture by means of a filler composition.

The step of filling the pores of the yarns, as performed prior to impregnating the texture with the consolidation composition, serves to "relocate" said composition to outside the yarns and thus to prevent the matrix that is obtained by the liquid technique from forming inside the yarns.

The yarn-filling step may comprise impregnating the yarns of the fabric by means of a liquid composition.

Impregnation of the yarns with the filler composition may be performed on the fiber texture prior to the texture being shaped in order to obtain the fiber preform, or after it has been shaped. In the first case impregnation with the consolidation composition may also be performed before the fiber texture is shaped or after said shaping.

It is also possible to perform impregnation before forming the fiber texture, i.e. by impregnating each yarn separately with the filler composition and then weaving the texture with the impregnated yarns.

The filler liquid composition may be eliminated prior to the step of densification by a gas technique so as to enable the matrix obtained by the gas technique to be deposited to the cores of the yarns of the preform, or else it may be conserved throughout the fabrication method, in which case the nature of the filler composition should be selected so that it forms a material that does not degrade thermomechanical performance.

If it is to be eliminated, the filler composition may contain a sacrificial resin that is eliminated from the pores within the yarns during the heat treatment for transforming the precursor of the consolidation material so as to re-open access to the insides of the yarns prior to performing densification by a gas technique.

To ensure good relocation of the consolidation liquid composition to outside the yarns of the texture, the sacrificial resin is preferably not miscible with the consolidation liquid composition. The sacrificial resin is selected in particular from silicone oils, polyvinyl acetate, and thermoplastic resins.

Alternatively, the yarns of the fiber texture may be filled by weaving a mixture of C or SiC yarns together with thermoplastic yarns, the thermoplastic yarns being eliminated during the heat treatment for transforming the precursor.

The preform may be made from a fiber texture made of carbon or ceramic fibers and the precursor for the consolidation material in the consolidation liquid composition may be a resin selected from resins that are precursors of carbon and resins that are precursors of ceramic.

When the fiber preform is made from a fiber texture of ceramic fibers consolidated by a liquid technique using a ceramic-precursor resin, the filler composition may contain a carbon-precursor resin, the resulting resin coke in the yarns after pyrolysis being eliminated by controlled oxidation of the preform. In this way, during impregnation of the texture with the ceramic-precursor consolidation resin, the pores in the yarns of the texture are filled in temporarily and then re-opened by controlled oxidation, prior to being densified so as to enable the matrix to be formed inside the yarns by the gas technique.

The carbon-precursor resin may be polymerized prior to impregnating the fiber texture with the ceramic-precursor consolidation resin. It is also possible to polymerize the carbon-precursor resin subsequently, i.e. at the same time as the consolidation resin is polymerized.

When the filler composition is not eliminated prior to densifying the preform, the filler composition may contain a ceramic-precursor resin, the consolidation liquid composition then containing a carbon-precursor resin. Thus, during pyrolysis of the carbon-precursor resin, the ceramic-precursor resin present in the pores of the yarns is also transformed so as to form a ceramic. Consequently, the yarns of the fiber reinforcement in the final part are densified with a ceramic, which is much less sensitive to oxidation than is carbon. The part then presents improved thermomechanical properties.

The ceramic-precursor resin may be polymerized prior to impregnating the fiber texture with the carbon-precursor consolidation resin. The ceramic-precursor resin may also be polymerized subsequently, i.e. at the same time as polymerizing the consolidation resin.

BRIEF DESCRIPTION OF THE DRAWINGS

Other characteristics and advantages of the invention appear from the following description of particular implementations of the invention, given as non-limiting examples and with reference to the accompanying drawings, in which:

FIGS. 6 and 7 are flow charts showing successive steps of other implementations of a method in accordance with the invention.

DETAILED DESCRIPTION OF IMPLEMENTATIONS

Figure 1:
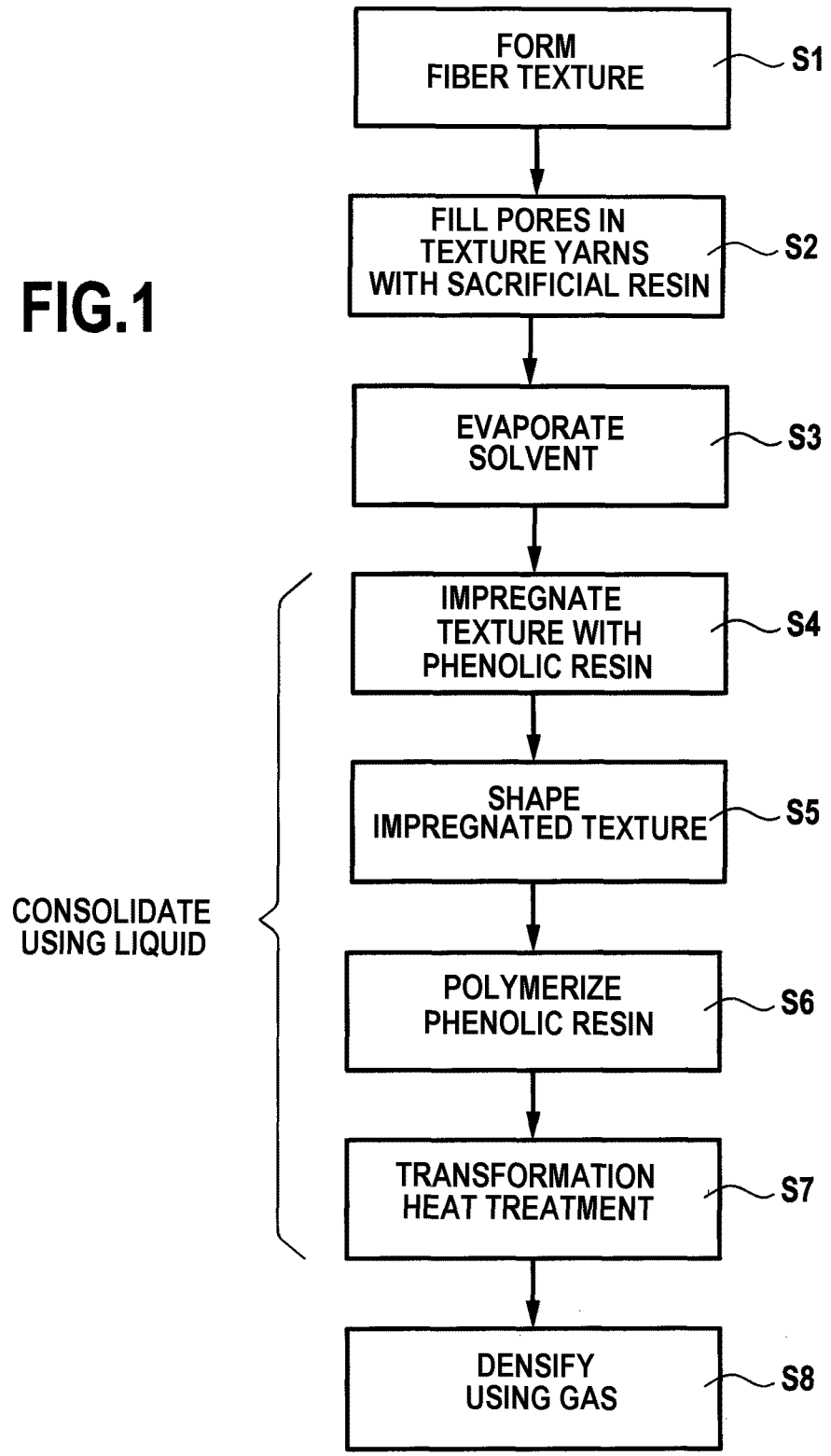
FIG. 1 is a flow chart showing successive steps of an implementation of a method in accordance with the invention.

The present invention relates to a method of fabricating a part made of thermostructural composite material in which the consolidation matrix obtained by a liquid technique prior to the step of densification by a gas technique is "relocated" to outside the yarns of the fiber texture of the preform by previously filling in the pores thereof (intra-yarn spaces) with a filler composition.

More precisely, the fiber texture used comprises a plurality of yarns (which may in certain circumstances be grouped together to form tows). Each yarn is constituted by a plurality of fibers and/or filaments with spaces existing between them that are referred to as "intra-yarn spaces". The intra-yarn spaces form the pores within the yarns. Furthermore, on a larger scale, spaces also exist within the fiber structure between the yarns themselves, which spaces are referred to as "inter-yarn spaces". In the present invention, the filler composition is used to pre-fill the intra-yarn spaces so as to enable the consolidation matrix to be deposited by a liquid technique solely in the inter-yarn spaces.

The quantity of filler composition needs to be selected in such a manner as to enable only the intra-yarn spaces to be filled (pores within the yarns). It must be sufficient to ensure that all of the intra-yarn spaces are filled. In particular, the quantity of composition used for performing this filling must be greater than the quantity used when it is desired solely to bond the fibers together, since when the composition is used as a binder it needs to be present only at those portions where there is contact between the fibers. In addition, the quantity of filler composition needs to be adjusted to avoid overflowing to the outside of the yarns where it would occupy the inter-yarn spaces present between the yarns of the texture.

In accordance with the invention, the filler composition, which may be liquid or solid, is introduced into the insides of the yarns of the fiber texture prior to the texture being impregnated with the consolidation liquid composition that contains a precursor for the consolidating material that corresponds to the consolidation matrix.

In a first approach, the filler composition or the material that results from said composition is eliminated prior to the step of densifying the fiber preform using a gas technique so as to re-open the pores within the yarns and enable the matrix that is deposited by the gas technique while densifying the preform to penetrate into the insides of the yarns. Thus, even when using the liquid technique for consolidation, composite materials are obtained that present improved thermomechanical characteristics close to those of a material consolidated by the gas technique, since the matrix deposited by the gas technique during densification is also present inside the yarns of the preform and not only outside them, as usually happens when a fiber preform is consolidated by a liquid technique and then densified by a gas technique.

In a second approach, prior to impregnating the fiber texture with a consolidation liquid composition containing a carbon precursor, the pores of the yarns of the texture are filled with a liquid composition containing a resin that gives rise, after pyrolysis, to a material (pyrolysate) that presents characteristics that are improved compared with the characteristics of carbon. In particular, the pyrolysate must be non-oxidizable. This second approach makes it possible to have a non-oxidizable material in the cores of the yarns, thus ensuring that they present characteristics that are improved compared with yarns having cores that contain carbon (resin coke) as usually occurs when consolidating by a liquid technique using a carbon-precursor resin. Under such circumstances, composite materials are also obtained that present thermomechanical characteristics that are improved, since the resin that generates carbon after pyrolysis is kept outside the yarns. By filling the yarns of the fiber texture in this way prior to impregnating the texture with the consolidation composition, it is no longer necessary to implement particular methods for reducing the coke content of the resin or to use additives that enable a glass to be formed to provide protection against oxidization. It is thus possible to use any type of organic resin for the consolidation by the liquid technique, without restriction on the coke content that can result therefrom.

Impregnation of the yarns with the filler composition may be performed directly on the fiber texture, or earlier, i.e. by impregnating each of the yarns separately with the filler composition and then weaving the texture with those yarns.

When the filler composition or the material that results from said composition is eliminated prior to the step of densifying the fiber preform by a gas technique, the filler composition may be a liquid composition such as a sacrificial resin or a solid composition in the form of thermoplastic yarns mixed with yarns of C or SiC, the thermoplastic yarns subsequently being eliminated during the heat treatment for transforming the precursor.

In addition to the step of filling the pores of the yarns of the fiber texture, the method of fabricating a part of composite material in accordance with the invention includes the well-known step of preparing a reinforcing fiber texture, shaping and consolidating the texture by a liquid technique so as to obtain a consolidated preform, and densifying the preform by a gas technique.

The initial fiber texture may be made of fibers of various kinds, in particular carbon fibers or ceramic fibers (e.g. silicon carbide fibers). For the purpose of shaping by a liquid technique, the texture is advantageously in the form of two-dimensional plies, e.g. layers of knitted or woven fabric, sheets of yarns or tows, etc., that may be bonded together by needling or by stitching, or that may be assembled together by a felt. The texture may also be made by three-dimensional weaving, braiding, or knitting yarns, or by any other known technique. The woven layers may be formed by yarns made from filaments that are continuous or discontinuous.

In well-known manner, consolidation by a liquid technique is performed by impregnating the fiber texture with an organic precursor of the material that is desired for the first phase of the matrix that provides consolidation. This may involve precursors of carbon (phenolic resin, furanic resin, pitch, etc.) or precursors of ceramic such as polysilanes or polysilazanes that are precursors of silicon carbide, polycarbosilanes or other precursors such as those obtained by a sol/gel technique, dissolved salts, . . . .

The fiber texture is generally shaped by molding before or after the fiber texture is impregnated with the consolidation composition.

The impregnated fiber texture is polymerized, generally at a temperature of less than 200° C. At this stage, the shaped texture is subjected to heat treatment in order to transform the precursor by pyrolysis. This treatment is performed at a temperature that generally lies in the range 500° C. to 2800° C., depending on the nature of the precursor, the texture optionally being held in shape in the mold in order to avoid deformation thereof.

Densification by a gas technique is performed by chemical vapor infiltration without using support tooling in an infiltration oven into which a gas is admitted that generally contains gaseous precursors of carbon or of ceramic, in particular silicon carbide (SiC). Gas techniques for forming matrices are well known.

The densification by a gas technique may optionally begin with a step of depositing an interphase layer, as described in U.S. Pat. Nos. 4,752,503 and 5,486,379.

With reference to FIG. 1, an implementation of a method of fabricating a thermostructural composite material part in accordance with the invention is described in which the pores of the yarns of the texture are initially filled with a sacrificial resin, i.e. with a resin that disappeared after pyrolysis, leaving little carbon residue (resin coke), not more than 10% by weight and preferably less than 5% by weight.

The first step (step S1) consists in forming a fiber texture from carbon fibers or ceramic fibers (e.g. SiC fibers).

There follows a step of filling the pores of the yarns of the fiber texture by impregnating the texture with a sacrificial resin. In the presently-described example, the texture is impregnated with silicone oil that is diluted in a solvent (step S2).

In this implementation, the objective is to fill the pores of the yarns of the fiber texture with a resin that, after pyrolysis, leaves no or practically no residue. The resin used for this filling operation needs to remain within the yarns until the end of polymerization of the consolidation resin. For this purpose, the filler resin must not be miscible with the consolidation resin, and it must not be miscible with any solvents that might be used while impregnating the fiber texture with the consolidation resin.

The quantity of sacrificial resin used for filling needs to be selected so as to enable only the intra-yarn spaces (pores within the yarns) to be filled, i.e. it must not overflow to the outside of the yarns and occupy the inter-yarns spaces present between the yarns of the texture. These inter-yarn spaces are to be filled with the consolidation resin.

After the yarns of the fiber texture have been impregnated with the silicone oil, the solvent is evaporated (step S3), thereby concentration the silicone oil in the yarns. At this stage, the fiber texture remains flexible and it is impregnated with a liquid consolidation composition, here a phenolic resin possibly diluted in a solvent, e.g. ethyl alcohol (step S4). After optional steps of evaporating the solvent and of pre-polymerization (pre-lining), the impregnated fiber texture is shaped by molding (step S5), and the phenolic resin is polymerized (step S6). The texture is then subjected to heat treatment to transform the phenolic resin by pyrolysis into solid carbon residues (resin coke), thereby consolidating the texture and obtaining a fiber preform that holds together (self-supporting preform) (step S7).

The fiber texture may equally well be shaped (step S5) before or after the texture is impregnated with the filler liquid composition (step S2), before or after evaporating the solvent of the filler composition (step S3), or indeed prior to impregnating with the consolidation liquid composition (step S4).

During pyrolysis, the silicone oil present within the yarns transforms into volatile components that are exhausted from the texture while the phenolic resin cokes.

At this stage in the method, the preform is sufficiently rigid to be placed in an oven for densification by chemical vapor infiltration (CVI) without requiring tooling to be used (step S8). Depending on the nature of the gas introduced into the oven, a carbon or ceramic matrix is formed within the fiber texture. The pores inside the yarns have been re-opened by the silicone oil being eliminated during the heat treatment, so the gas penetrates both into the inter-yarn spaces and into the pores within the yarns, thereby enabling a matrix to be performed by means of a gas both outside the yarns of the preform and within them.

The thermomechanical properties of the composite material part made in this way are better than those of a part made in similar manner but without prior filling of the pores within the yarns by means of a sacrificial resin. It can be shown that the yarns of a part fabricated in accordance with the method of the invention present a coke content that is very low and that they are densified essentially by the matrix obtained by CVI.

This relocation of the matrix formed by a liquid technique to outside the yarns may also be obtained by replacing silicone oil with polyvinyl acetate (PVA) or with a thermoplastic resin of the polymethyl methacrylate (PMMA) type, for example. Under such circumstances, unlike the texture impregnated with silicone oil, the fiber texture becomes rigid prior to being impregnated with the phenolic resin so it is necessary to shape the texture at the same time as it is being impregnated with PVA or thermoplastic resin.

Other consolidation resins may equally well be used instead of phenolic resin. Carbon-precursor resins such as a ceramic resin or pitch, or ceramic-precursor resins such as polycarbosilazane, polycarbosilane, or polysiloxane resins can also be used, depending on the characteristics of the material it is desired to obtain.

Figure 2:
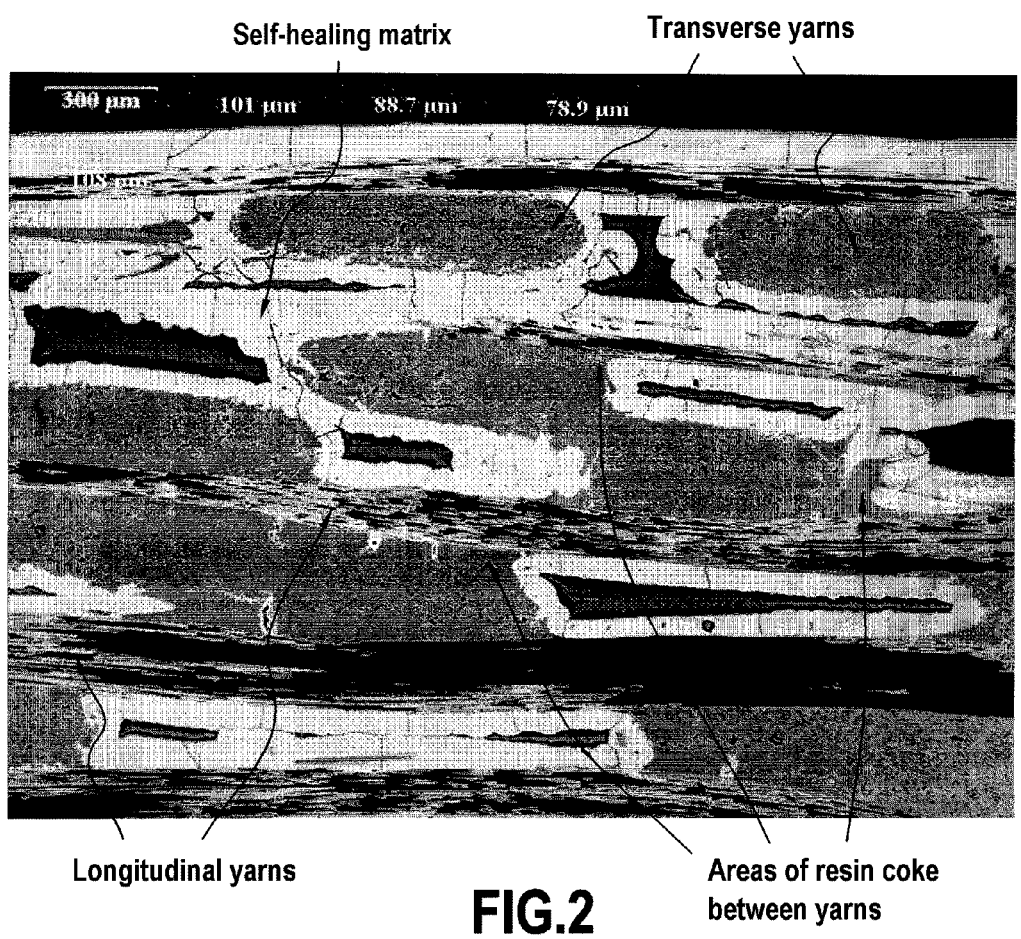
FIGS. 2 and 3 are microphotographs showing a composite material obtained in accordance with a method of the invention.
Figure 3:
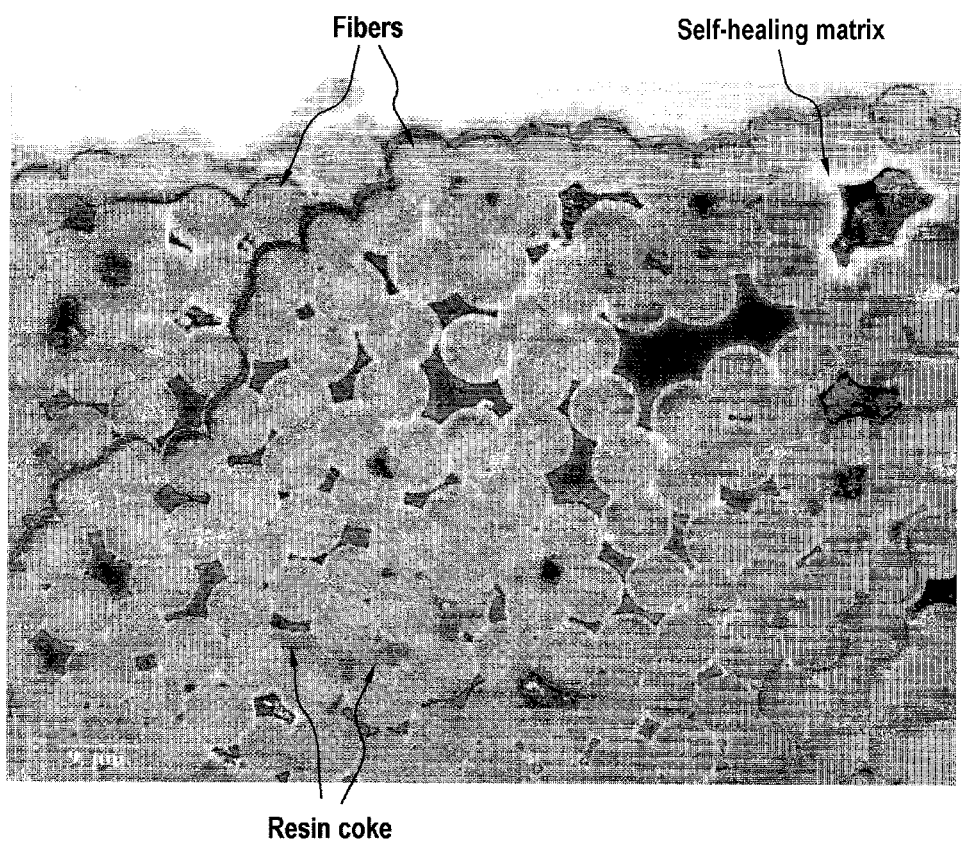

FIGS. 2 and 3 show respectively the results obtained in the inter-yarn spaces and in the intra-yarn spaces when the pores in the yarns of the fiber texture are initially filled with a sacrificial resin as described above, while FIGS. 4 and 5 show respectively the results obtained in the inter-yarn spaces and the intra-yarn spaces when the pores in the yarns are not previously filled.

The composite material of FIGS. 2 to 5 is a C/C material made under the following conditions:
　forming a fiber texture by making a multilayer structure of three-dimensional carbon fiber weaving (e.g. Guipex™ fabric);
　liquid consolidation by impregnating the texture in a bath of phenolic resin and ethyl alcohol (60%:40%) ("soaking" then drip-drying), evaporating the solvent and pre-polymerization (pre-lining) in a stove at 90° C., molding in a press to the desired thickness with weight uptake of 24%, and carbonizing at a temperature of about 800° C. to transform the phenolic resin into resin coke; and
　CVI densification with a self-healing matrix (SiC) to obtain relative density greater than 2.

For the material of FIGS. 2 and 3, the fiber texture is also previously impregnated with a sacrificial resin under the following conditions:

preparing a solution of polyvinyl acetate (PVA) in water (15%:85%);

impregnating plies of three-dimensional carbon fiber weaving with the PVA/water solution by "soaking" and then drip-drying;

evaporating the water in a stove at 30° C. for 5 hours; and molding in a press to the desired thickness with weight takeup of 22%.

The PVA resin is eliminated during carbonizing.

Figure 4:
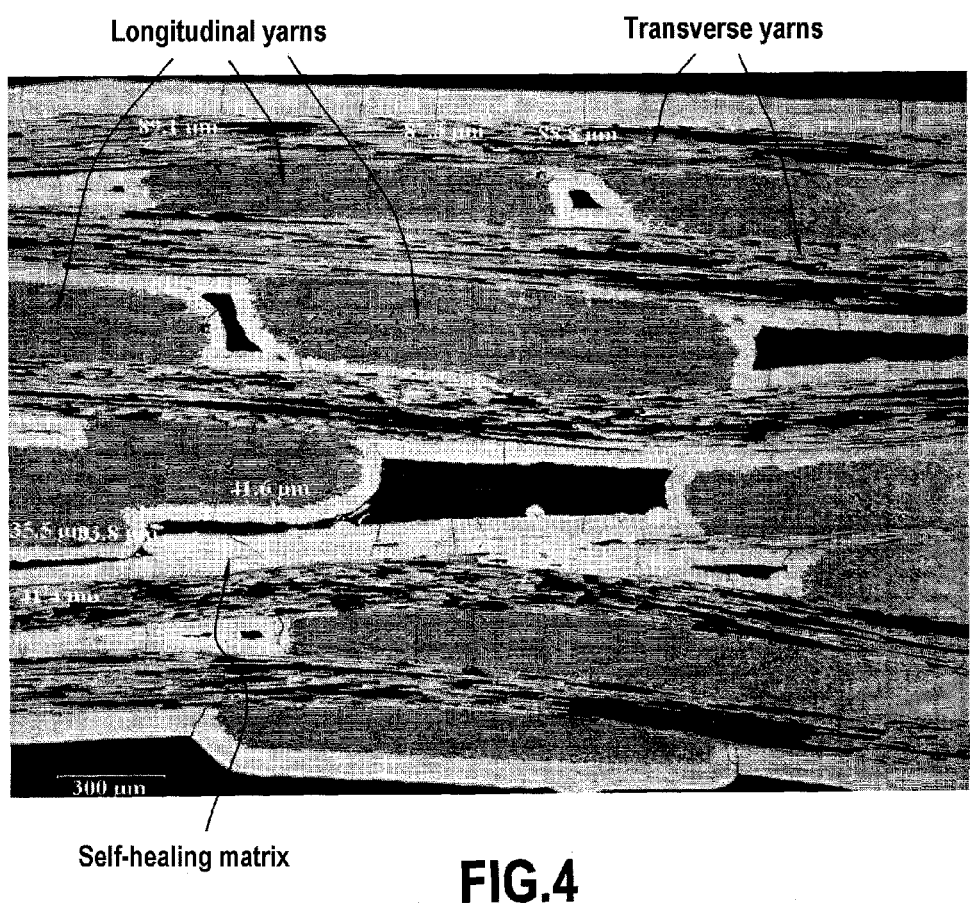
FIGS. 4 and 5 are microphotographs showing a material obtained with a prior art method.

In FIG. 2 (microphotograph of the material obtained with pre-impregnation of the fiber texture with a sacrificial resin), there can be seen the presence of areas of resin coke in the inter-yarn spaces, whereas in FIG. 4 (microphotograph of material obtained without pre-impregnation of the fiber texture with a sacrificial resin), it can be seen that there is no coke between the yarns. This absence of resin coke in the inter-yarn spaces is due to the fact that without prior filling of the yarns of the fiber texture, the phenolic resin penetrates for the most part into the yarns of the texture, thereby leading to the presence of a large amount of phenolic resin coke in the yarns after carbonizing, as can be seen in FIG. 5.

In contrast, when the yarns of the texture have previously been filled with PVA resin, it can be seen that there is very little phenolic resin coke within the yarns, as shown in FIG. 3. The phenolic resin has been prevented from penetrating into the yarns of the texture and it is concentrated in the inter-yarn spaces in which it forms areas of resin coke that encourage bonding between the yarns (FIG. 2).

Figure 5:
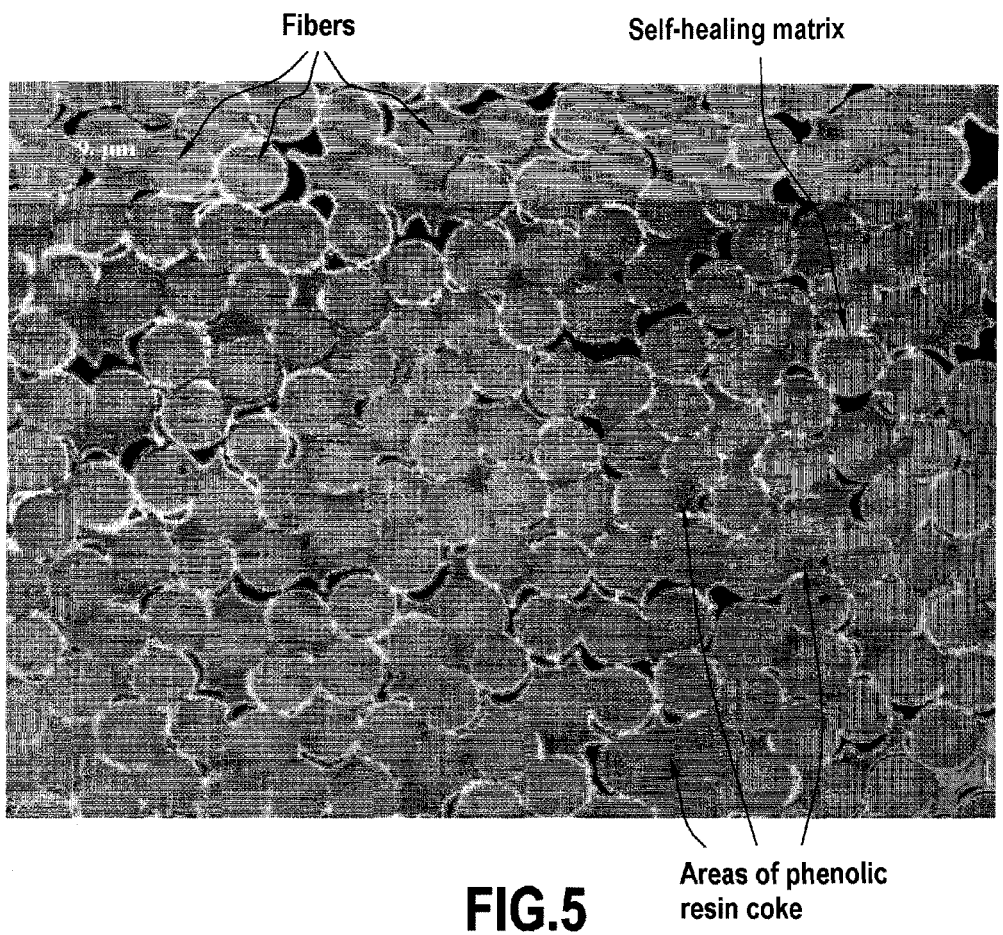

In addition, by comparing the materials of FIGS. 3 and 5, it can be seen that the self-healing matrix deposited by CVI is distributed more uniformly in the yarns that were previously filled with PVA resin (FIG. 3) than in the yarns that were not filled (FIG. 5). When the yarns are previously impregnated with a sacrificial resin, the pores therein are re-opened prior to chemical vapor infiltration during the carbonization, whereas without such prior impregnation, a large fraction of the pore volume within the yarns is plugged by the resin coke formed during the carbonization.

The results of mechanical traction testing at ambient temperature performed on the material obtained with pre-impregnation of the yarns with PVA resin are given in Table I below.

TABLE I

| Traction testing | | | |
|---|---|---|---|
| Material | σr (MPa) | εr (%) | E (GPa) |
| With PVA step | 296 | 0.61 | 78 |
| Without PVA step | 260 | 0.62 | 75 |

The results obtained show that prior filling of the yarns of the fiber texture with a sacrificial resin serves to improve the mechanical properties of the material.

Figure 6:
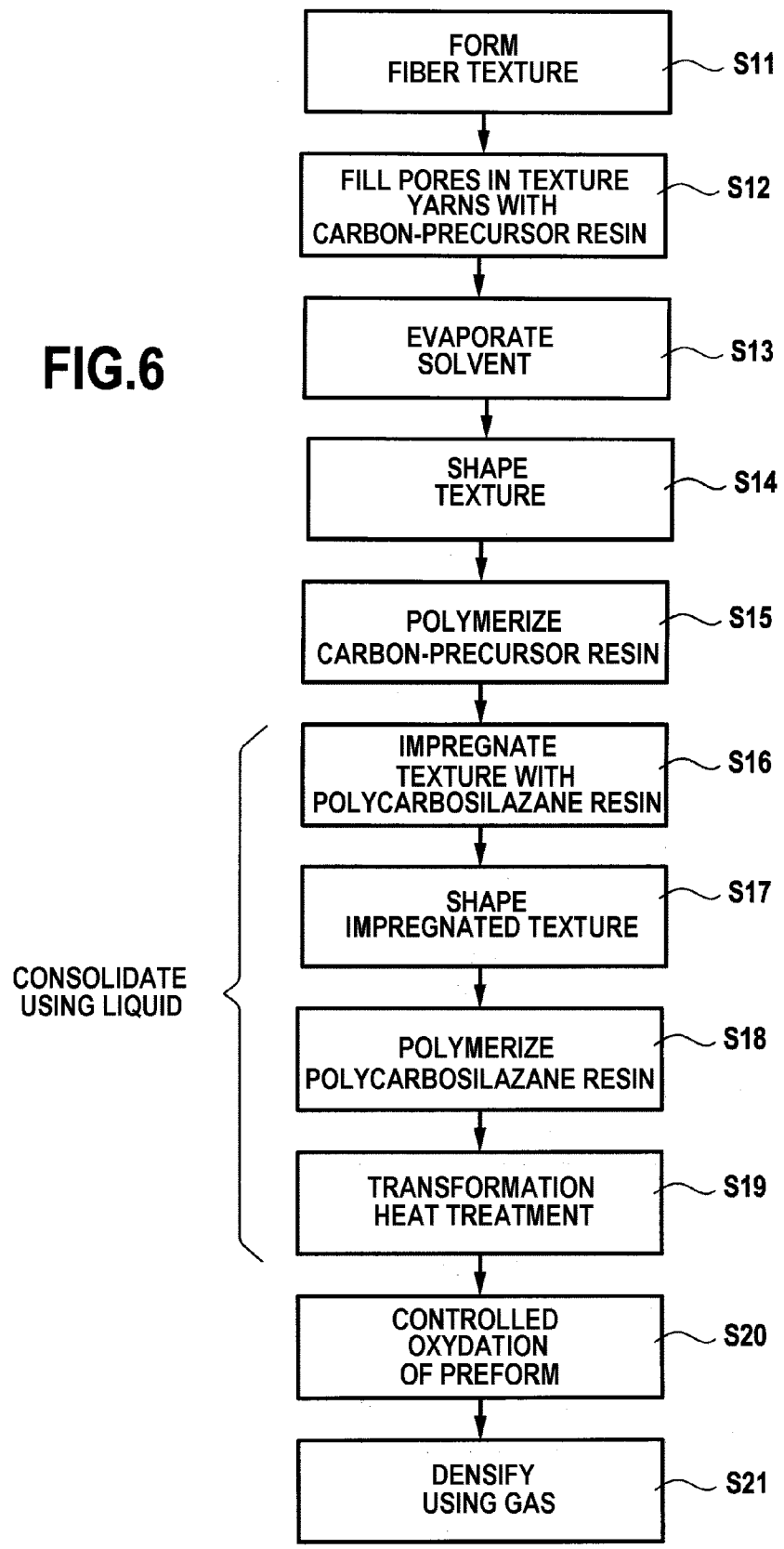

FIG. 6 shows another implementation of a method in accordance with the invention that differs from the implementation described with reference to FIG. 1 in that use is made firstly of a carbon-precursor resin instead of a sacrificial resin for filling the pores of the texture yarns, and secondly of a ceramic-precursor resin instead of a carbon-precursor resin for consolidating by a liquid technique.

The first step (step S11) consists in forming a fiber texture from ceramic fibers (e.g. SiC).

Thereafter, there follows the step of filling the pores of the yarns of the fiber texture by impregnating them with a liquid composition containing a carbon precursor, here a phenolic resin diluted in a solvent (e.g. ethyl alcohol) (step S12). The quantity of phenolic resin used for filling needs to be selected in such a manner as to enable only the intra-yarn spaces to be filled (pores within the yarns) without occupying the inter-yarn spaces present between the yarns of the texture.

After the yarns of the fiber texture have been impregnated with the filler composition, the solvent is evaporated (step S13), thereby concentrating the phenolic resin in the yarns. The fiber texture is shaped by molding (step S14) and the phenolic resin is polymerized (step S15). The fiber texture may equally well be shaped prior to being impregnated with the phenolic resin (step S12) or prior to evaporating the solvent of the filler composition (step S13).

The texture is then impregnated with a consolidation liquid composition containing a ceramic precursor, here a polycarbosilazane resin possibly diluted in a solvent (step S16). After optional steps of evaporating the solvent and of pre-polymerization (pre-lining), the impregnated fiber texture is again shaped by molding (step S17), and the polycarbosilazane resin is polymerized (step S18). The texture is then subjected to heat treatment to transform the phenolic resin by pyrolysis into solid carbon residues (phenolic resin coke) and to transform the polycarbosilazane resin into an SiCN ceramic (step S19), thus enabling a consolidated fiber preform to be obtained.

After this pyrolysis step, the preform is subjected to oxidation performed at about 450° C. in order to eliminate the carbon (phenolic resin coke) without degrading the yarns of the preform or the consolidation ceramic (step S20).

At this stage in the method, the preform is sufficiently rigid to be placed without tooling in an oven for densification by chemical vapor infiltration (CVI), into which oven a gas is admitted that is a precursor for a ceramic (SiC) (step S21), which admission may optionally be preceded by CVI deposition of an interphase layer to protect the bared fibers as described in U.S. Pat. Nos. 4,752,503 and 5,486,379. Since the pores of the yarns have been re-opened by oxidizing the resin coke, the gas penetrates both into the inter-yarn spaces and into the pores within the yarns, thereby enabling a matrix to be formed by CVI both outside and inside the yarns of the preform, thus obtaining a composite material part having thermomechanical properties close to those of a part that has been consolidated using a gas technique. It can be shown that the yarns of the parts fabricated in accordance with the method of the invention do not contain coke and are densified with the matrix obtained by CVI. The SiCN ceramic that results from pyrolyzing the polycarbosilazane resin is concentrated in the inter-yarn spaces.

In a variant implementation, the fiber texture may be impregnated with the polycarbosilazane resin immediately after being impregnated with the phenolic resin (or after pre-lining) so as to have a fiber texture during consolidation that is still flexible and so as to perform only one step of shaping by molding.

The phenolic resin used for filling the pores in the yarns may be replaced by a ceramic resin or by pitch, for example, while the polycarbosilazane resin used for consolidation may be replaced by a polycarbosilazane or a polysiloxane resin, for example.

An implementation of a method of fabricating a composite material part in accordance with the invention is described below with reference to FIG. 7, in which the pores in the yarns of the texture are filled with a liquid composition containing a resin having a pyrolysate that presents characteristics that are improved compared with a resin coke, and in particular the characteristic of not being oxidizable. In the example described below, the filler liquid composition is a precursor resin for the SiC ceramic, such as for example a polycarbosilazane resin.

The first step (step S31) consists in forming a fiber texture from carbon fibers (or possibly ceramic fibers).

Thereafter, a step is performed of filling the pores in the yarns of the fiber texture by impregnating the texture with a polycarbosilazane resin diluted in a solvent (step S32). The quantity of polycarbosilazane resin used for filling needs to be selected in such a manner as to enable only the intra-yarn spaces (pores within the yarns) to be filled, i.e. without overflowing to the outsides of the yarns so as to avoid occupying the inter-yarn spaces that present between the yarns of the texture. These inter-yarn spaces are filled subsequently with the consolidation resin.

After impregnating the yarns of the fiber texture with the polycarbosilazane resin, the solvent is evaporated (step S33), thereby having the effect of concentrating the polycarbosilazane resin in the yarns. The fiber texture is shaped by molding (step S34) and the polycarbosilazane resin is polymerized (step S35). It is also possible to shape the fiber texture prior to impregnating the texture with the filler liquid composition (step S32) or prior to evaporating the solvent of the filler composition (step S33).

The texture is then impregnated with a consolidation liquid composition, here a phenolic resin possibly diluted in a solvent (step S36). After optional steps of evaporating the solvent and of pre-polymerization (pre-lining), the impregnated fiber texture is once more shaped by molding (step S37), and the phenolic resin is polymerized (step S38). The texture is then subjected to heat treatment to transform the polycarbosilazane resin by pyrolysis into a SiCN ceramic and the phenolic resin into solid carbon residues (resin coke) (step S39), thereby making it possible to obtain a consolidated fiber preform. The formation of the SiCN ceramic by pyrolyzing the polycarbosilazane resin is accompanied by the material shrinking, thereby partially re-opening the pores in the yarns so that they can be densified by a subsequent gas technique.

At this stage of the method, the preform is sufficiently rigid to be placed without tooling in an oven for densification by chemical vapor infiltration (CVI) with a gas that is a precursor for a ceramic (SiC) or carbon (pyrocarbon) being admitted into the oven (step S40), possibly with prior CVI deposition of an interphase layer as described in U.S. Pat. Nos. 4,752,503 and 5,486,379. Since the pores inside the yarns are filled with the SiCN ceramic, there is very little resin coke inside the yarns, which are densified by the SiCN ceramic matrix and by the matrix obtained by CVI, thus making it possible to obtain a composite material part having thermomechanical properties that are better than those of a part in which the yarns of the preform are not previously filled with a ceramic-precursor resin.

In a variant implementation, the fiber texture may be impregnated with the phenolic resin immediately after being impregnated with the polycarbosilazane resin so that during consolidation the fiber texture is still flexible, thus making it possible to perform only one shaping step by molding.

The polycarbosilazane resin used for filling the pores in the yarns may be replaced by a polycarbosilane or a polysiloxane resin for example, whereas the phenolic resin used for consolidation may be replaced by a furanic resin or by pitch, for example.

In the example below, two C/C composite materials were made: a test piece A and a test piece B made under the following conditions:

forming a fiber texture by making a multilayer structure by three-dimensional weaving carbon fibers (e.g. Guipex™ fabric);

consolidating the texture by a liquid technique by impregnating it in a bath of phenolic resin heated to 80° C. ("soaking" followed by drip-drying), molding under a vacuum pouch with a weight uptake of 21%, and carbonizing at a temperature of about 800° C. to transform the phenolic resin into resin coke; and using a gas technique (CVI) to densify the texture with a self-healing matrix (SiC) until a relative density greater than 2 is obtained.

Furthermore, the fiber texture of test piece A was also previously impregnated with a ceramic-precursor resin under the following conditions:

impregnating plies of three-dimensionally woven carbon fibers with a polysilazane pre-ceramic resin (KiON VL 20® resin) by "soaking" and then drip-drying; and molding under a vacuum pouch with a weight uptake of 30%.

The results of mechanical traction testing at ambient temperature on test pieces A and B are given in Table II below.

TABLE II

| Traction testing | | | |
|---|---|---|---|
| Material | σr (MPa) | εr (%) | E (GPa) |
| Test piece A | 260 | 0.76 | 95 |
| Test piece B | 220 | 0.55 | 90 |

The results obtained show clearly that prior filling of the yarns of the fiber texture with a ceramic-precursor resin makes it possible to achieve mechanical properties that are somewhat improved compared with those obtained without such filling.

The results of lifetime fatigue testing in traction (traction at 0.25 Hz) on test pieces A and B are given in Table III below.

TABLE III

| Lifetime (LT) testing | | | |
|---|---|---|---|
| Material | σr (MPa) | θ (° C.) | LT (h) |
| Test piece A | 120 | 600 | 70 |
| Test piece B | 120 | 600 | 3 |

The results obtained show a clear improvement in lifetime when the yarns of the fiber texture are previously filled with a ceramic-precursor resin.

The invention claimed is:

1. A method of fabricating a composite material part comprising fiber reinforcement densified by a matrix, said method comprising the steps of:

making a fiber preform consolidated by impregnating a fiber texture made up of yarns with a liquid consolidation composition containing a precursor for a consolidating material, and by transforming the precursor into consolidating material by pyrolysis so as to obtain a consolidated preform that is held in shape; and densifying the consolidated fiber preform by chemical vapor infiltration;

the method being characterized in that it includes, prior to impregnation of the fiber texture with the consolidation liquid composition and prior to chemical vapor infiltration of the fiber preform, a step of filling the pores of the yarns of said fiber texture by means of a filler composition;

the method being further characterized in that in the filling step, the quantity of filler liquid composition is selected in such a manner as to fill the internal spaces within the yarns without any overflowing so as to prevent the filler liquid from occupying any of the spaces between the yarns of the fiber texture.

2. A method according to claim 1, characterized in that in the filling step, the pores of the yarns of said texture are filled by means of a filler liquid composition.

3. A method according to claim 2, characterized in that the filler liquid composition contains a sacrificial resin.

4. A method according to claim 3, characterized in that the sacrificial resin is not miscible with the filler liquid composition.

5. A method according to claim 3, characterized in that the sacrificial resin is selected from silicone oils, polyvinyl acetate, and thermoplastic resins.

6. A method according to claim 2, characterized in that the preform is made from a carbon or ceramic fiber texture and in that the consolidating material precursor of the consolidation liquid composition is a resin selected from carbon-precursor resins and ceramic-precursor resins.

7. A method according to claim 1, characterized in that, in the filling step, the pores in the yarns of said texture are filled by means of thermoplastic yarns mixed with the yarns of said texture.

8. A method according to claim 1, characterized in that the fiber preform is made from a ceramic fiber texture and in that the filler liquid composition contains a carbon-precursor resin, said preform being oxidized after pyrolysis to eliminate the coke of the carbon-precursor resin.

9. A method according to claim 8, characterized in that the consolidating material precursor of the consolidation liquid composition is a ceramic-precursor resin.

10. A method according to claim 9, characterized in that the ceramic-precursor resin of the consolidation liquid composition is a resin selected from polycarbosilazane resin, polycarbosilane resin, and polysiloxane resin.

11. A method according to claim 10, characterized in that it includes, prior to impregnating the fiber texture with the consolidation liquid composition, a step of polymerizing the carbon-precursor resin.

12. A method according to claim 9, characterized in that it includes, prior to impregnating the fiber texture with the consolidation liquid composition, a step of polymerizing the carbon-precursor resin.

13. A method according to claim 8, characterized in that it includes, prior to impregnating the fiber texture with the consolidation liquid composition, a step of polymerizing the carbon-precursor resin.

14. A method according to claim 1, characterized in that the filler liquid composition contains a ceramic-precursor resin, the consolidation liquid composition containing a carbon-precursor resin.

15. A method according to claim 14, characterized in that the ceramic-precursor resin of the filler liquid composition is a resin selected from polycarbosilazane resin, polycarbosilane resin, and polysiloxane resin.

16. A method according to claim 15, characterized in that it includes, prior to impregnating the yarns of the fiber texture with the consolidation liquid composition, a step of polymerizing the ceramic-precursor resin.

17. A method according to claim 14, characterized in that it includes, prior to impregnating the yarns of the fiber texture with the consolidation liquid composition, a step of polymerizing the ceramic-precursor resin.

18. A method according to claim 1, characterized in that the filler liquid composition contains a sacrificial resin.

19. A method according to claim 18, characterized in that the sacrificial resin is not miscible with the filler liquid composition.

20. A method according to claim 1, characterized in that the preform is made from a carbon or ceramic fiber texture and in that the consolidating material precursor of the consolidation liquid composition is a resin selected from carbon-precursor resins and ceramic-precursor resins.

* * * * *